US012312225B2

(12) United States Patent
Itozawa et al.

(10) Patent No.: US 12,312,225 B2
(45) Date of Patent: May 27, 2025

(54) TRANSPORT SYSTEM

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo (JP); Yutaro Takagi, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 546 days.

(21) Appl. No.: 17/539,006

(22) Filed: Nov. 30, 2021

(65) Prior Publication Data

US 2022/0259024 A1 Aug. 18, 2022

(30) Foreign Application Priority Data

Feb. 15, 2021 (JP) ................................ 2021-022066

(51) Int. Cl.
*B66F 9/18* (2006.01)
*B66F 9/06* (2006.01)

(52) U.S. Cl.
CPC ................ *B66F 9/18* (2013.01); *B66F 9/063* (2013.01)

(58) Field of Classification Search
CPC ......... B60P 7/08; B60P 7/0807; B60P 7/0892; B60P 7/10; B60P 7/13; B60P 7/135; B60P 7/14; B60P 7/15; B66F 9/18; B66F 9/063; Y10S 901/01
USPC ............................................................ 901/1
See application file for complete search history.

(56) References Cited

U.S. PATENT DOCUMENTS

| | | | | |
|---|---|---|---|---|
| 2,424,429 A * | 7/1947 | Bamberg | B60P 7/13 | 414/544 |
| 5,106,247 A * | 4/1992 | Hove | B63B 25/28 | 410/73 |
| 5,356,250 A * | 10/1994 | Vogg | B64D 9/003 | 410/86 |
| 6,234,550 B1 | 5/2001 | Stoltenhoff et al. | | |
| 9,120,622 B1 | 9/2015 | Elazary et al. | | |
| 9,676,397 B2 * | 6/2017 | Herzog | E01B 29/17 | |
| 11,738,944 B2 | 8/2023 | Iwamoto et al. | | |
| 11,919,157 B2 | 3/2024 | Iwamoto et al. | | |
| 2005/0047895 A1 | 3/2005 | Lert, Jr. | | |
| 2008/0170925 A1 * | 7/2008 | Marmur | B60P 7/13 | 410/80 |

(Continued)

FOREIGN PATENT DOCUMENTS

| | | |
|---|---|---|
| CN | 202186320 U * | 4/2012 |
| CN | 104003089 A | 8/2014 |

(Continued)

OTHER PUBLICATIONS

Translation of Apr. 2, 2024 Office Action issued in Japanese Application No. 2021-022069.

*Primary Examiner* — Gerald McClain
(74) *Attorney, Agent, or Firm* — Oliff PLC

(57) ABSTRACT

A transport system is a transport system in which an autonomous mobile robot transports an object. The autonomous mobile robot includes a mounting portion on which the object is mounted, and a hook that hooks on the object mounted on the mounting portion from below. An upper surface of the mounting portion includes a recessed portion having a shape corresponding to a shape of a bottom surface of the object mounted on the mounting portion.

4 Claims, 9 Drawing Sheets

(56) References Cited

U.S. PATENT DOCUMENTS

| | | | | |
|---|---|---|---|---|
| 2015/0071743 | A1* | 3/2015 | Lert, Jr. | B65G 1/1378 414/807 |
| 2020/0172332 | A1 | 6/2020 | Moulin et al. | |
| 2020/0216298 | A1* | 7/2020 | Gravelle | B66F 9/122 |
| 2021/0395007 | A1 | 12/2021 | Galluzzo et al. | |
| 2022/0105621 | A1 | 4/2022 | Otsuki et al. | |
| 2022/0258358 | A1 | 8/2022 | Itozawa et al. | |
| 2022/0258974 | A1 | 8/2022 | Iwamoto et al. | |
| 2022/0267091 | A1 | 8/2022 | Ota et al. | |
| 2022/0274777 | A1 | 9/2022 | Ota et al. | |

FOREIGN PATENT DOCUMENTS

| | | | | | |
|---|---|---|---|---|---|
| CN | 106956892 | A | | 7/2017 | |
| CN | 210423437 | U | | 4/2020 | |
| CN | 111806334 | A | * | 10/2020 | B60P 7/13 |
| EP | 3978198 | A1 | | 4/2022 | |
| GB | 938618 | A | | 10/1963 | |
| JP | S55-53654 | Y2 | | 12/1980 | |
| JP | S61-107726 | U | | 7/1986 | |
| JP | H08-295242 | A | | 11/1996 | |
| JP | H11-029207 | A | | 2/1999 | |
| JP | 2005066809 | A | * | 3/2005 | |
| JP | 2008-273258 | A | | 11/2008 | |
| JP | 2013-234048 | A | | 11/2013 | |
| JP | 2015-178141 | A | | 10/2015 | |
| JP | 2017-505559 | A | | 2/2017 | |
| JP | 2017-088286 | A | | 5/2017 | |
| JP | 2017-190110 | A | | 10/2017 | |
| JP | 2020-006846 | A | | 1/2020 | |
| WO | 2015/077025 | A1 | | 5/2015 | |

* cited by examiner

TRANSPORT SYSTEM

CROSS-REFERENCE TO RELATED APPLICATION

This application claims priority to Japanese Patent Application No. 2021-022066 filed on Feb. 15, 2021, incorporated herein by reference in its entirety.

BACKGROUND

1. Technical Field

The present disclosure relates to a transport system, and more particularly to a transport system in which an autonomous mobile robot transports an object.

2. Description of Related Art

Various robots have been developed to transport objects. For example, Japanese Unexamined Patent Application Publication No. 2005-66809 (JP 2005-66809 A) discloses an agricultural work assistance robot for transporting agricultural products. The agricultural work assistance robot is provided with an engaging portion protruding from the upper surface of a main body portion. Displacement of a box for storing agricultural products mounted on the main body is suppressed by engaging a recessed portion provided on the bottom surface of the box with the engaging portion.

SUMMARY

In the configuration described in JP 2005-66809 A, the engaging portion may come off from the recessed portion due to vibration or the like during transportation, and a transport target object may be displaced.

The present disclosure has been made in consideration of the above circumstances as the background, and provides a transport system capable of suppressing displacement of the transport target object mounted on a mounting portion.

One aspect of the present disclosure for achieving the above object is a transport system in which an autonomous mobile robot transports an object. The autonomous mobile robot includes a mounting portion on which the object is mounted, and a hook that hooks on the object mounted on the mounting portion from below. An upper surface of the mounting portion includes a recessed portion having a shape corresponding to a shape of a bottom surface of the object mounted on the mounting portion. According to the transport system, the bottom surface of the object can be fitted into the recessed portion, and the hook can be hooked on the object from below. Therefore, the object mounted on the mounting portion can be suppressed from moving on the mounting portion in the horizontal direction and moving on the mounting portion in the vertical direction. Therefore, it is possible to suppress a transport target object mounted on the mounting portion from being displaced.

According to the above aspect, the hook may be a hook provided in the recessed portion and is movable in and out from the recessed portion. According to the configuration above, when the hook is not needed, the hook can be stored so as not to cause hindrance, thereby improving convenience.

According to the above aspect, the autonomous mobile robot may further include an arm provided with the hook, and a control unit that controls the arm. The control unit may cause the hook to hook on the object mounted on the mounting portion from below.

With such a configuration, the hook can be used for various purposes.

According to the above aspect, the shape of the recessed portion may be a shape corresponding to a shape of the entire bottom surface of the object. With such a configuration, the object without a protruding portion on the bottom surface can be mounted on the mounting portion.

According to the above aspect, the shape of the recessed portion may be a shape corresponding to a shape of a protruding portion provided on the bottom surface of the object. With such a configuration, the recessed portion does not need to accommodate the entire bottom surface of the object. Therefore, an object larger than the size of the recessed portion can be mounted on the mounting portion.

According to the present disclosure, it is possible to provide a transport system capable of suppressing displacement of the transport target object mounted on the mounting portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described below with reference to the drawings.

First Embodiment

Figure 1:
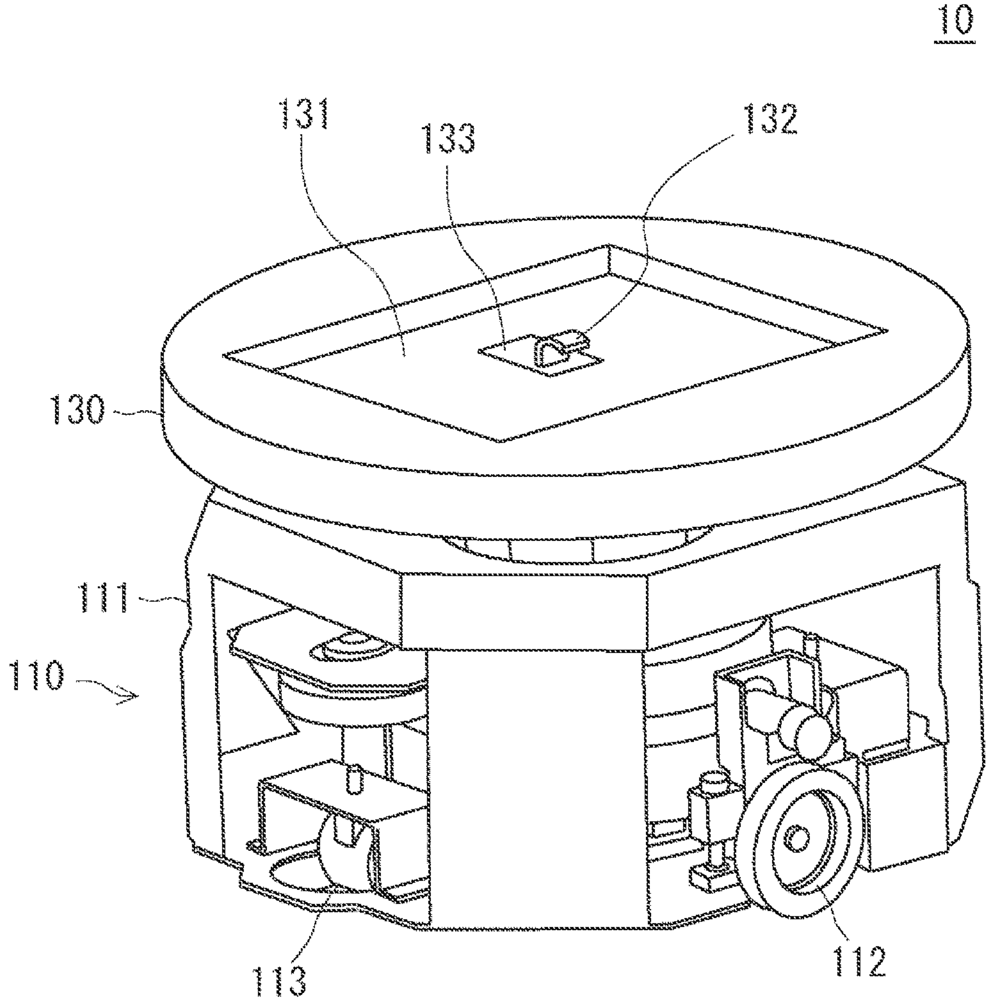
FIG. 1 is a perspective view showing a schematic configuration of an autonomous mobile robot according to a first embodiment.
Figure 2:
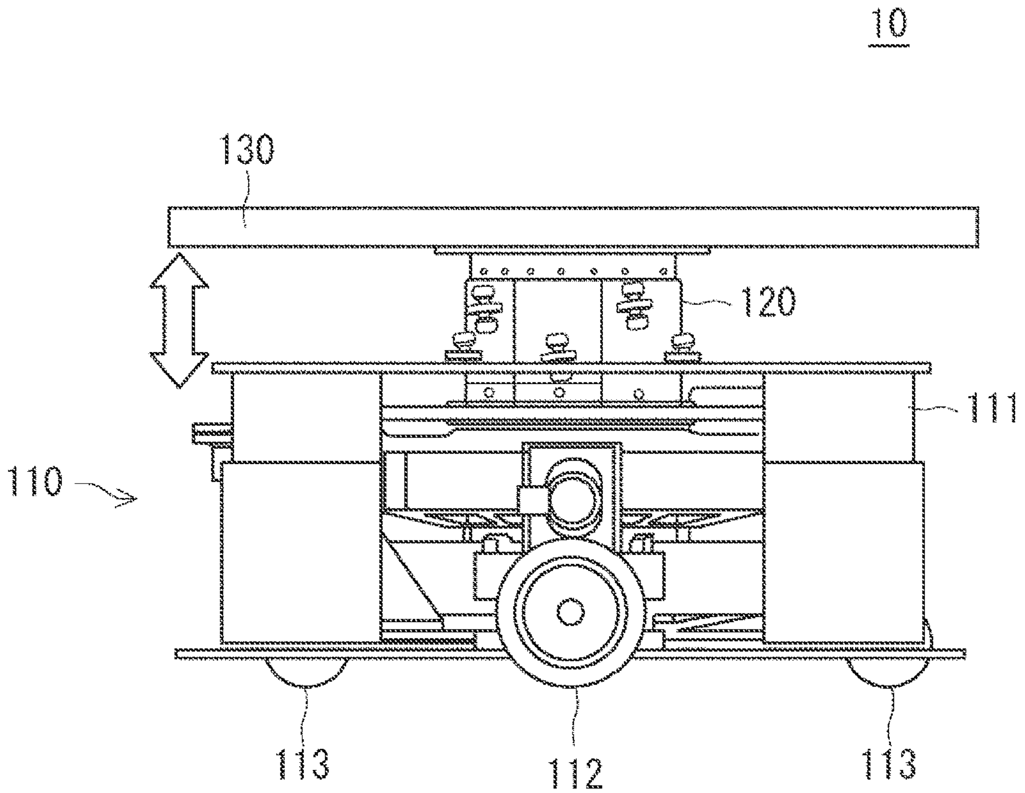
FIG. 2 is a side view showing a schematic configuration of the autonomous mobile robot according to the first embodiment.
Figure 3:
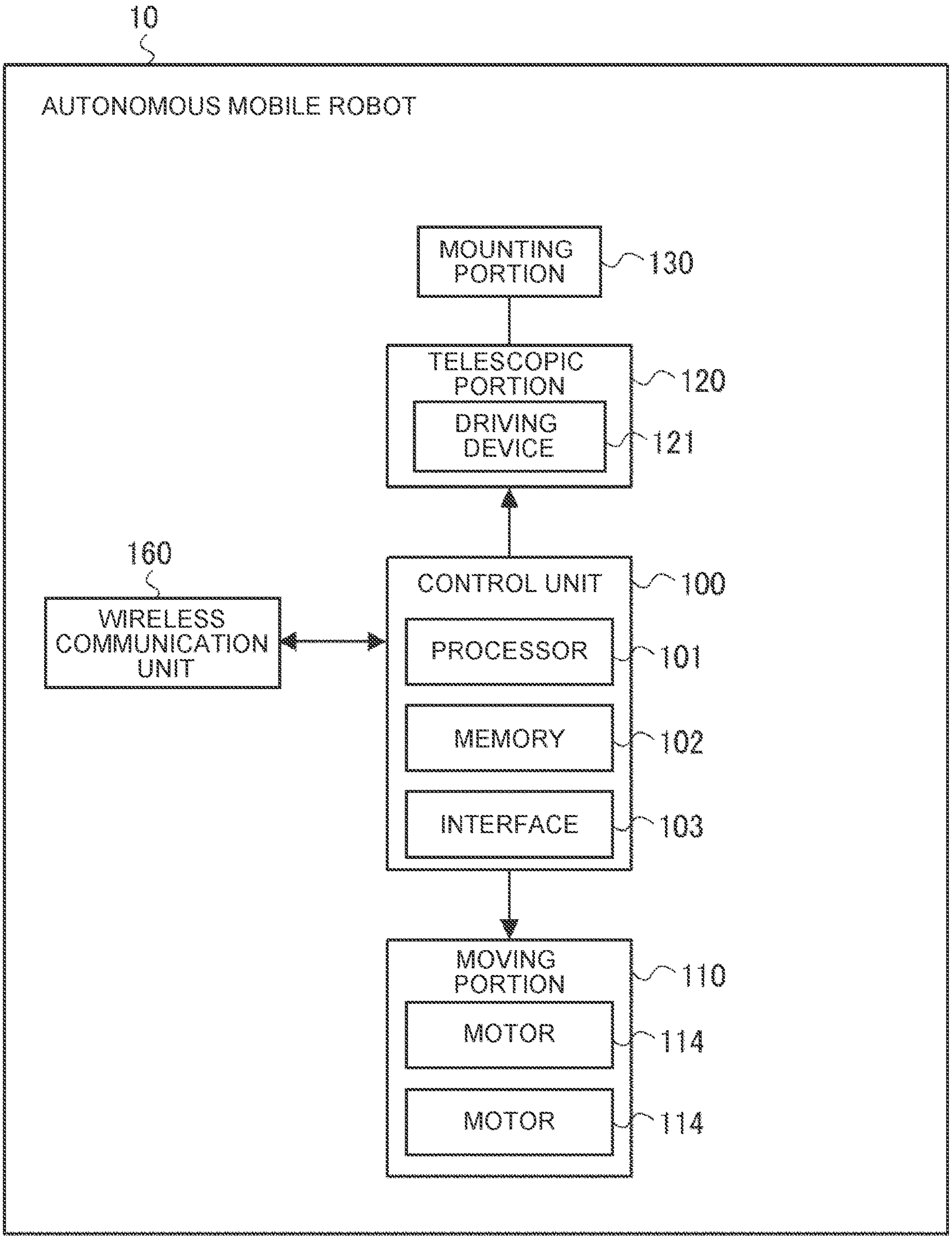
FIG. 3 is a block diagram showing a schematic system configuration of the autonomous mobile robot according to the first embodiment.

FIG. 1 is a perspective view showing a schematic configuration of an autonomous mobile robot 10 according to a first embodiment. FIG. 2 is a side view showing a schematic configuration of the autonomous mobile robot 10 according to the first embodiment. FIG. 3 is a block diagram showing a schematic system configuration of the autonomous mobile robot 10 according to the first embodiment.

The autonomous mobile robot 10 according to the present embodiment is a robot that autonomously moves in a moving environment such as a house, a facility, a warehouse, a factory, or an outdoor environment, and may belong to a transport system in which the autonomous mobile robot 10 supports and transports an object. The autonomous mobile robot 10 according to the present embodiment includes a moving portion 110 that is movable, a telescopic portion 120 that expands and contracts in the vertical direction, a mounting portion 130 for supporting a mounted object, a control unit 100 that controls the autonomous mobile robot 10 including control of the moving portion 110 and the telescopic portion 120, and a wireless communication unit 160.

The moving portion 110 includes a robot body 111, a pair of right and left drive wheels 112 and a pair of front and rear driven wheels 113 that are rotatably provided for the robot body 111, and a pair of motors 114. The motors 114 drive the respective drive wheels 112. Each motor 114 rotates the corresponding drive wheel 112 via a speed reducer or the like. Each motor 114 rotates the corresponding drive wheel 112 in accordance with a control signal from the control unit 100, thereby enabling forward movement, backward movement, and rotation of the robot body 111. With this configuration, the robot body 111 can move to a given position. Note that, the configuration of the moving portion 110 is an example, and the present disclosure is not limited to this. For example, the number of the drive wheels 112 and the driven wheels 113 of the moving portion 110 may be arbitrary, and a known configuration can be applied as long as the robot body 111 can be moved to an arbitrary position.

The telescopic portion 120 is a telescopic mechanism that expands and contracts in the vertical direction. The telescopic portion 120 may be configured as a telescopic type expansion and contraction mechanism. The mounting portion 130 is provided at the upper end of the telescopic portion 120, and the mounting portion 130 is raised or lowered by the operation of the telescopic portion 120. The telescopic portion 120 includes a driving device 121 such as a motor, and expands and contracts as the driving device 121 is driven. That is, the mounting portion 130 is raised or lowered as the driving device 121 is driven. The driving device 121 is driven in response to a control signal from the control unit 100. Note that, in the autonomous mobile robot 10, any known mechanism for controlling the height of the mounting portion 130 provided on the upper side of the robot body 111 may be used instead of the telescopic portion 120.

The mounting portion 130 is provided in an upper portion (at a tip) of the telescopic portion 120. The mounting portion 130 is lifted and lowered by the driving device 121 such as a motor. In the present embodiment, the mounting portion 130 is used for loading the object to be transported by the autonomous mobile robot 10. In order to transport the object, the autonomous mobile robot 10 moves together with the object while the object is supported by the mounting portion 130. With this configuration, the autonomous mobile robot 10 transports the object.

The mounting portion 130 is composed of, for example, a plate material serving as an upper surface and a plate material serving as a lower surface. In the present embodiment, the shape of the plate materials, that is, the shape of the mounting portion 130 is, for example, a disk shape. However, any other shape may be used.

The upper surface of the mounting portion 130 includes a recessed portion 131 having a shape corresponding to the shape of the bottom surface of the object to be mounted on the mounting portion 130, that is, a transport target object (see FIG. 1). The recessed portion 131 is a recess provided on the upper surface of the mounting portion 130. In the present embodiment, the shape of the recessed portion 131, that is, the shape of the bottom surface of the transport target object is rectangular. However, any other shape such as a circle may be used.

Figure 4:
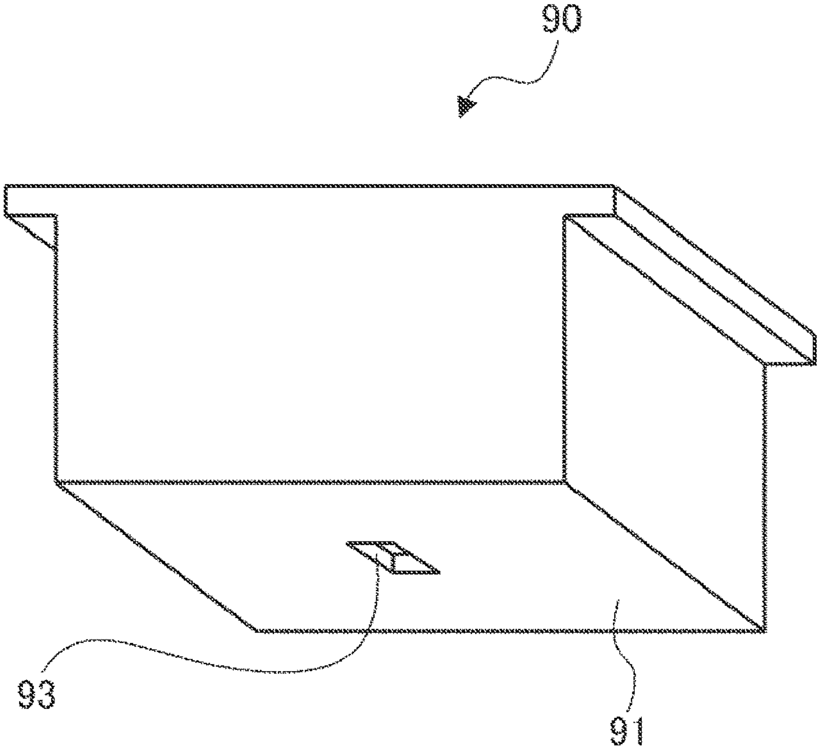
FIG. 4 is a perspective view showing an example of an object mounted on a mounting portion.
Figure 5:
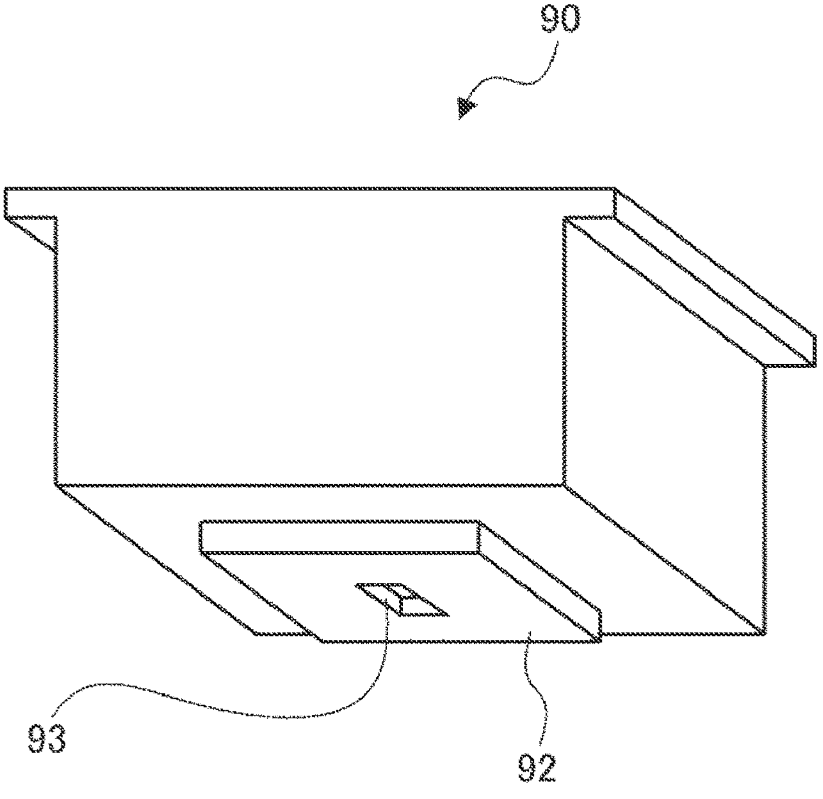
FIG. 5 is a perspective view showing another example of an object mounted on the mounting portion.

FIG. 4 is a perspective view showing an example of an object 90 mounted on the mounting portion 130, and FIG. 5 is a perspective view showing another example of the object 90 mounted on the mounting portion 130. FIGS. 4 and 5 are perspective views showing the front surface, the bottom surface, and the side surface of the object 90. The object 90 is, for example, a rectangular parallelepiped container (box). However, the object 90 is not limited to this and may be any object. The object 90 can accommodate any other object as a container.

The shape of the recessed portion 131 of the mounting portion 130 may be a shape corresponding to the shape of an entire bottom surface 91 of the object 90 as shown in FIG. 4, or may be a shape corresponding to a protruding portion 92 provided on the bottom surface of the object 90 as shown in FIG. 5. When the shape of the recessed portion 131 corresponds to the shape of the entire bottom surface 91 of the object 90, the object 90 without a protruding portion on the bottom surface can be mounted on the mounting portion 130. On the other hand, when the shape of the recessed portion 131 corresponds to the shape of the protruding portion provided on the bottom surface of the object 90, the recessed portion 131 does not need to accommodate the entire bottom surface of the object 90. Therefore, the object 90 larger than the size of the recessed portion 131 can be mounted on the mounting portion 130.

The bottom surface of the object mounted on the mounting portion 130 fits into the recessed portion 131. For example, the entire bottom surface 91 of the object 90 (see FIG. 4) or the protruding portion 92 provided on the bottom surface of the object 90 fits into the recessed portion 131. This suppresses the object 90 mounted on the mounting portion 130 from moving on the mounting portion 130. That is, it is possible to suppress displacement of the object 90 on the mounting portion 130. Therefore, for example, even when vibration during movement of the autonomous mobile robot 10 is generated, it is possible to suppress the object 90 mounted on the mounting portion 130 from falling from the mounting portion 130.

Further, in the present embodiment, the mounting portion 130 is provided with a configuration for suppressing the object 90 mounted on the mounting portion 130 from moving in the vertical direction. Specifically, a hook 132 that can be taken in and out for hooking the object mounted on the mounting portion 130 from below is provided in the recessed portion 131. In the example shown in FIG. 1, the hook 132 is provided so as to be able to be taken in and out from the bottom surface of the recessed portion 131. That is, the hook 132 can be switched between a state in which the hook 132 protrudes upward from an opening 133 provided on the bottom surface of the recessed portion 131 (hereinafter referred to as a hook used state) and a state in which the hook 132 is stored under the opening 133, that is, inside the mounting portion 130 (hereinafter referred to as the hook stored state). Therefore, when the hook 132 is not needed, the hook 132 can be stored so as not to cause hindrance, thereby improving convenience.

Figure 6:
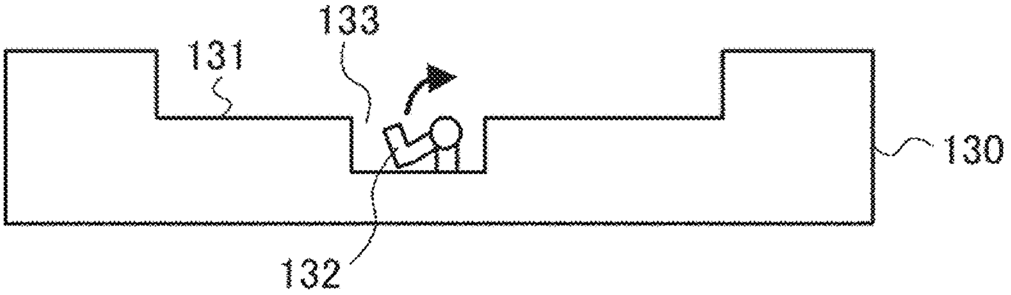
FIG. 6 is a schematic view showing a state in which a hook is stored.
Figure 7:
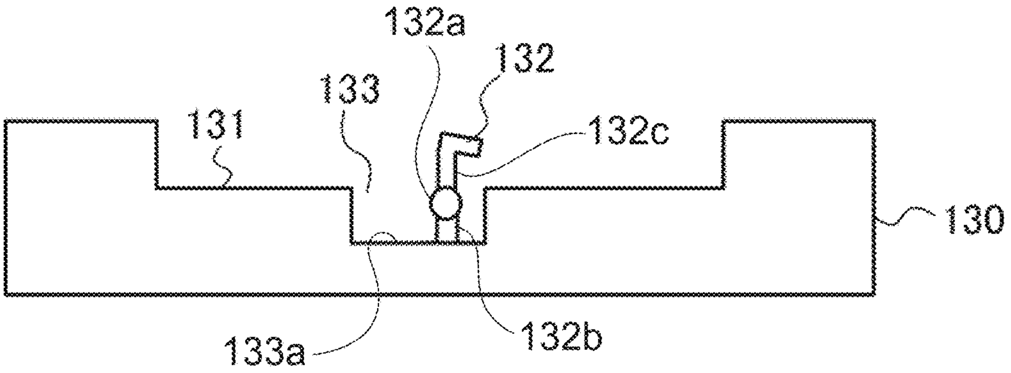
FIG. 7 is a schematic view showing a state in which a hook is used.

FIG. 6 is a schematic view showing the hook stored state of the hook 132, and FIG. 7 is a schematic view showing the hook used state of the hook 132. As shown in FIGS. 6 and 7, the hook 132 includes a middle portion 132*a*, a first arm 132*b* that connects the middle portion 132*a* to a base surface 133*a* of the opening 133, and a second arm 132*c* configured to rotate about the middle portion 132*a* relative to the first arm 132*b*, and changes its state from the hook stored state to the hook used state as the hook 132 rises by rotating. That is, the direction of the hook 132 can be changed. The hook 132 switches between the hook used state and the hook stored state in accordance with the control signal from the control unit 100.

Figure 8:
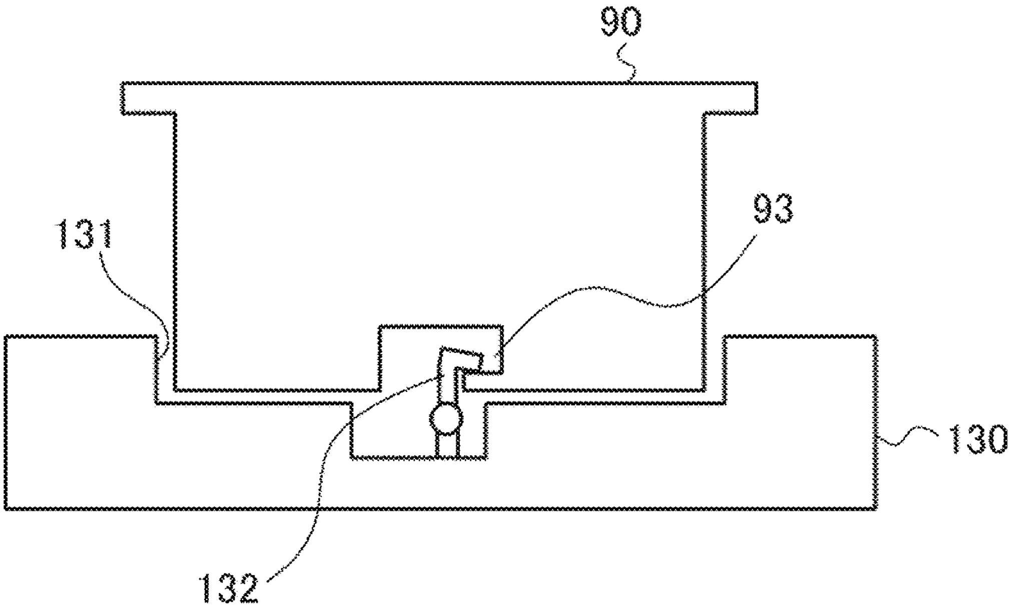
FIG. 8 is a schematic view showing an example of a state in which the hook is hooked on a hook receiver of the object fitted into a recessed portion of the mounting portion.

A hook receiver 93 on which the hook 132 is hooked is provided on the bottom surface of the object 90. For example, the hook receiver 93 is an engaging portion on which the hook 132 is hooked, and is provided at a predetermined position on the entire bottom surface 91 of the object 90 or at a predetermined position on the protruding portion 92 of the object 90 (see FIG. 4 or FIG. 5). When the hook 132 is turned into the hook used state, the hook 132 is hooked on the hook receiver 93 of the object 90 mounted on the mounting portion 130. FIG. 8 is a schematic view showing an example of a state in which the hook 132 is hooked on the hook receiver 93 of the object 90 fitted into the recessed portion 131 of the mounting portion 130. Hooking the hook 132 on the hook receiver 93 hinders vertical movement of the object 90 mounted on the mounting portion 130. Therefore, it is possible to further suppress falling of the object when the autonomous mobile robot 10 transports the object, etc. Note that, in the example shown in FIG. 8, the hook receiver 93 is a hole having a recess therein in the horizontal direction. However, the hook receiver 93 may be a bar, a ring, or the like, and includes an arbitrary structure for hooking the hook.

In the present embodiment, the mounting portion 130 is provided with the hook 132 as described above. However, when it is not necessary to restrict the vertical movement of the object 90 mounted on the mounting portion 130, the hook 132 may be omitted.

Returning to FIG. 3, the wireless communication unit 160 is a circuit for performing wireless communication to communicate with a server or another robot as needed, and includes, for example, a wireless transmission and reception circuit and an antenna. Note that, when the autonomous mobile robot 10 does not communicate with other devices, the wireless communication unit 160 may be omitted.

The control unit 100 is a device that controls the autonomous mobile robot 10, and includes a processor 101, a memory 102, and an interface 103. The processor 101, the memory 102, and the interface 103 are connected to each other via a data bus or the like.

The interface 103 is an input and output circuit used for communicating with other devices such as the moving portion 110, the telescopic portion 120, and the wireless communication unit 160.

The memory 102 is composed of, for example, a combination of a volatile memory and a non-volatile memory. The memory 102 is used to store software (computer program) including one or more commands to be executed by the processor 101, data used for executing various processes of the autonomous mobile robot 10, and the like.

The processor 101 reads software (computer program) from the memory 102 and executes the software to execute processes of the control unit 100, which will be described later.

The processor 101 may be, for example, a microprocessor, a microprocessor unit (MPU), or a central processing unit (CPU). The processor 101 may include a plurality of processors. As described above, the control unit 100 is a device that functions as a computer.

The above-mentioned program can be stored and supplied to a computer using various types of non-transitory computer-readable media. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). Further, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Next, the processes of the control unit 100 will be described. The control unit 100 controls the operation of the autonomous mobile robot 10. That is, the control unit 100 controls the operations of the moving portion 110, the telescopic portion 120, and the hook 132. The control unit 100 can control the rotation of each drive wheel 112 and move the robot body 111 to an arbitrary position by transmitting the control signal to each motor 114 of the moving portion 110. Further, the control unit 100 can control the height of the mounting portion 130 by transmitting the control signal to the driving device 121 of the telescopic portion 120. Further, the control unit 100 can control the direction of the hook 132 by transmitting the control signal to an actuator such as a motor that changes the direction of the hook 132. With this configuration, the state of the hook 132 is switched between the hook used state and the hook stored state.

As described above, the control unit 100 may control movement of the autonomous mobile robot 10 by executing known control such as feedback control or robust control based on rotation information of the drive wheels 112 detected by rotation sensors provided for the drive wheels 112. Further, the control unit 100 may cause the autonomous mobile robot 10 to move autonomously by controlling the moving portion 110 based on information such as distance information detected by a distance sensor such as a camera or an ultrasonic sensor provided to the autonomous mobile robot 10 and map information of the moving environment.

Further, when a predetermined locking condition is satisfied, the control unit 100 changes the state of the hook 132 to the hook used state. That is, the control unit 100 controls the hook 132 such that the hook 132 is hooked on the hook receiver 93 of the object 90 when the predetermined locking condition is satisfied. Here, the locking condition may be that the autonomous mobile robot 10 receives an input instructing the hook 132 to be hooked on the hook receiver 93, or the object 90 is mounted on the mounting portion 130 (recessed portion 131), that is, the bottom surface of the object 90 is fitted into the recessed portion 131. The control unit 100 may determine whether the object 90 is mounted on the mounting portion 130 (recessed portion 131) by, for example, acquiring a detection result of the sensor that detects whether the object is present in the recessed portion 131, or acquiring a notification from another device such as a server. Further, when a predetermined unlocking condition is satisfied, the control unit 100 changes the state of the hook 132 to the hook stored state. That is, the control unit 100 controls the hook 132 such that the hook 132 is disengaged from the hook receiver 93 of the object 90 when the predetermined unlocking condition is satisfied. Here, the unlocking condition may be that the autonomous mobile robot 10 receives an input instructing the hook 132 to be disengaged from the hook receiver 93, or that transportation of the object 90 to the destination is completed.

The first embodiment has been described as above. As described above, the upper surface of the mounting portion 130 includes a recessed portion 131 having a shape corresponding to the shape of the bottom surface of the object to be mounted on the mounting portion 130. Therefore, the bottom surface of the object can be fitted into the recessed portion 131, and the object mounted on the mounting portion 130 can be suppressed from moving on the mounting portion 130 in the horizontal direction. Further, in the present embodiment, the mounting portion 130 further includes the hook 132. Therefore, it is possible to suppress the object mounted on the mounting portion 130 from moving in the vertical direction. Therefore, it is possible to suppress the transport target object that is mounted on the mounting portion 130 from being displaced.

Second Embodiment

Hereinafter, a second embodiment will be described. In the first embodiment, a dedicated hook is used to suppress the object mounted on the mounting portion 130 from moving in the vertical direction. However, vertical movement of the object mounted on the mounting portion 130 may be suppressed by diverting the configuration for other purposes instead of the dedicated hook. In the present embodiment, an arm provided in the autonomous mobile robot is used to suppress the object mounted on the mounting portion 130 from moving in the vertical direction.

Figure 9:
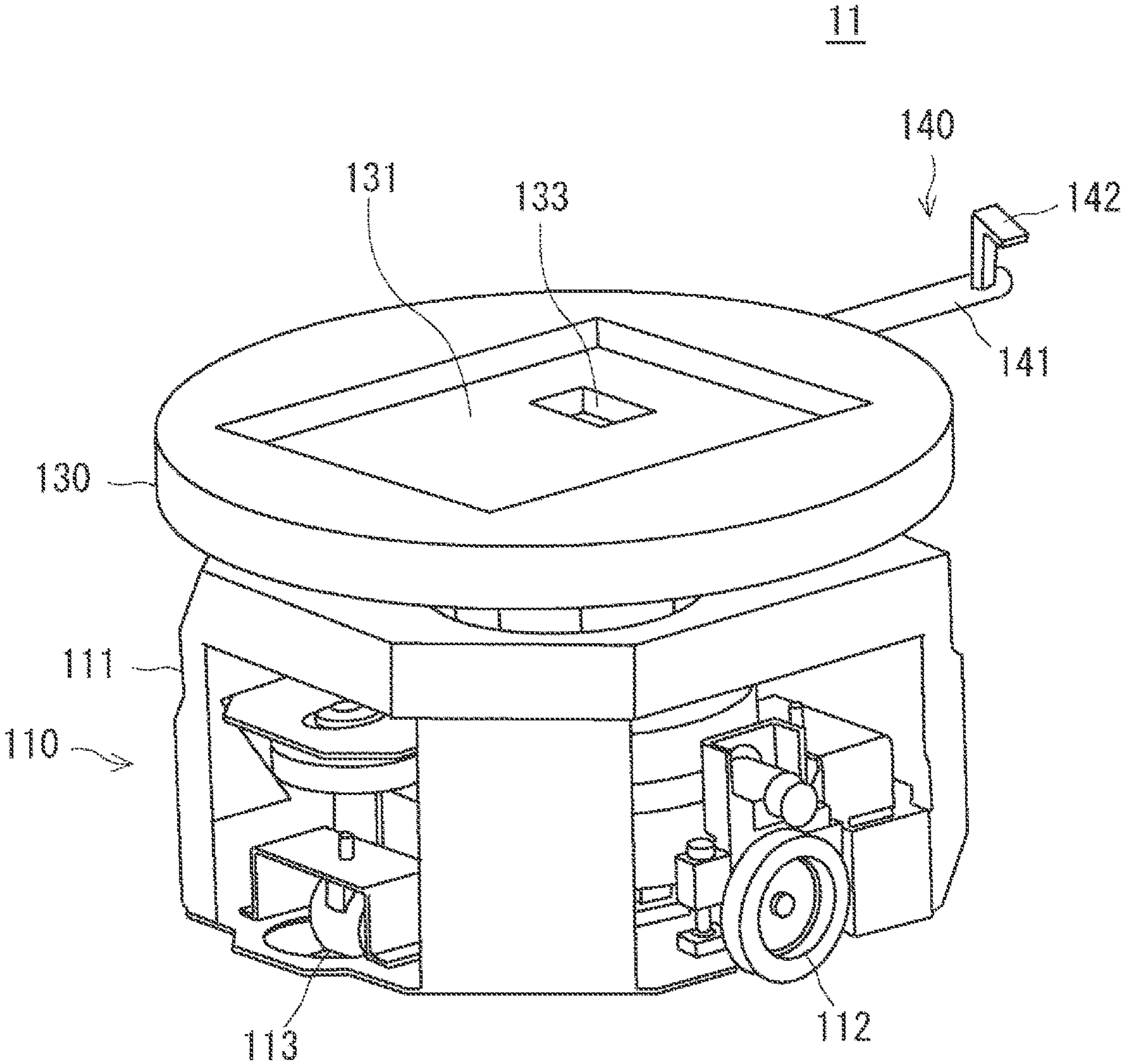
FIG. 9 is a perspective view showing a schematic configuration of an autonomous mobile robot according to a second embodiment.
Figure 10:
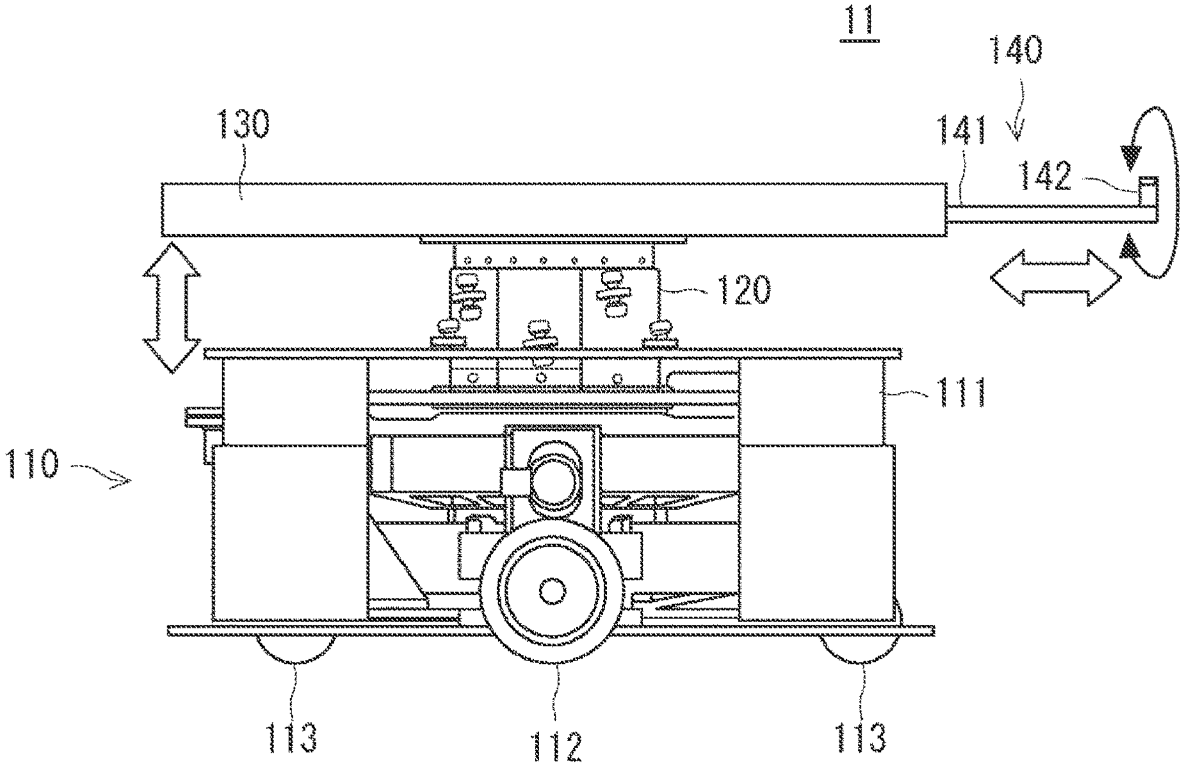
FIG. 10 is a side view showing a schematic configuration of the autonomous mobile robot according to the second embodiment.
Figure 11:
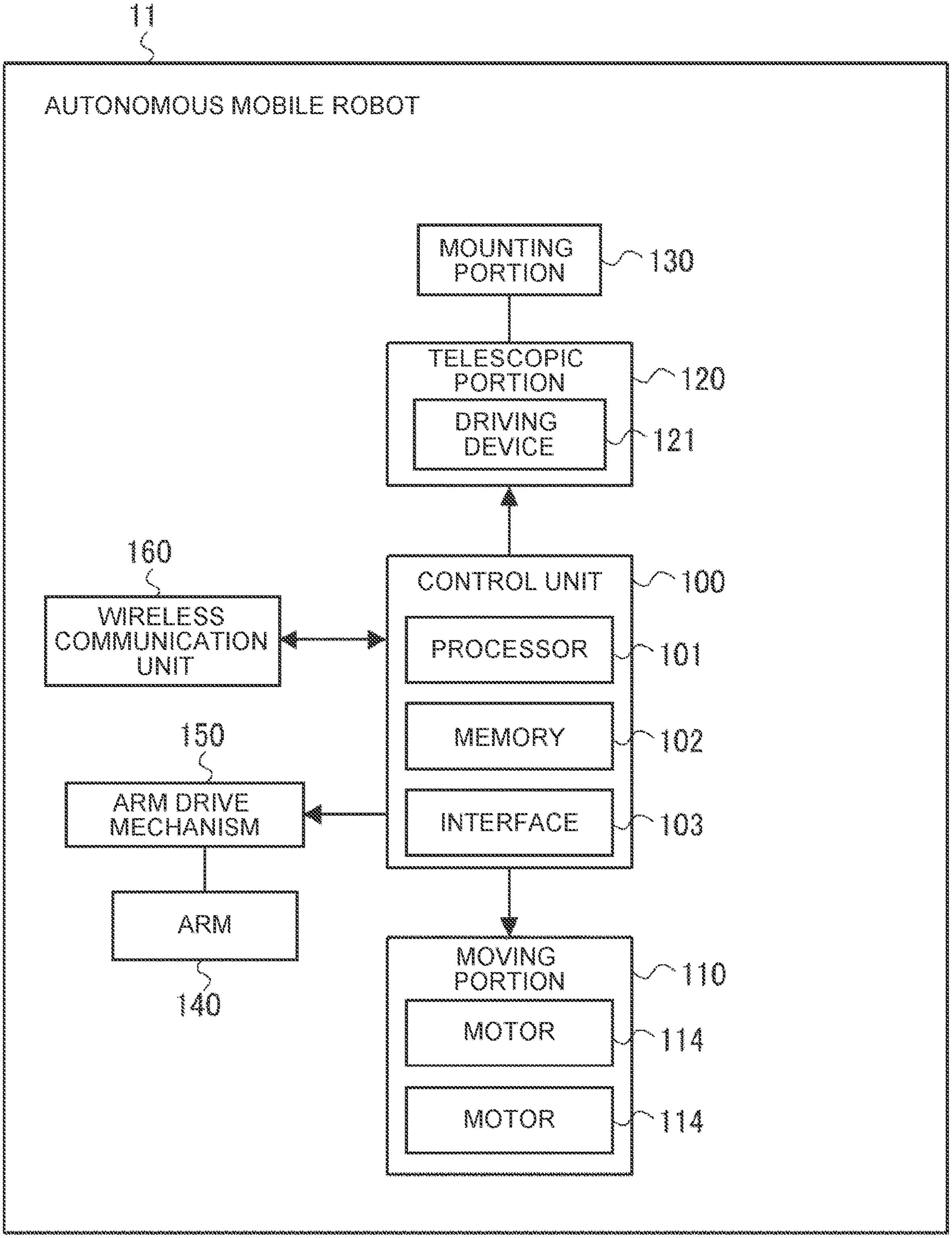
FIG. 11 is a block diagram showing a schematic system configuration of the autonomous mobile robot according to the second embodiment.

FIG. 9 is a perspective view showing a schematic configuration of an autonomous mobile robot 11 according to the second embodiment. FIG. 10 is a side view showing a schematic configuration of the autonomous mobile robot 11 according to the second embodiment. FIG. 11 is a block diagram showing a schematic system configuration of the autonomous mobile robot 11 according to the second embodiment.

The autonomous mobile robot 11 according to the present embodiment includes the moving portion 110, the telescopic portion 120, the mounting portion 130, an arm 140, an arm drive mechanism 150, the control unit 100 that controls the autonomous mobile robot 11 including control of the moving portion 110, the telescopic portion 120, and the arm 140, and the wireless communication unit 160. Hereinafter, a configuration different from that of the first embodiment will be described, and a description of the same configuration as that of the first embodiment will be omitted as appropriate.

The mounting portion 130 according to the present embodiment has a space for accommodating the arm 140 and the arm drive mechanism 150 between the upper surface and the lower surface. Note that, as in the first embodiment, the upper surface of the mounting portion 130 includes a recessed portion 131 having a shape corresponding to the shape of the bottom surface of the object 90 mounted on the mounting portion 130.

The mounting portion 130 according to the present embodiment is provided with the arm 140 that is horizontally moved in and out of the mounting portion 130. The arm 140 includes a shaft portion 141 extending in the horizontal direction and a hook 142 provided at the tip of the shaft portion 141. Further, the mounting portion 130 is provided with the arm drive mechanism 150 that moves the arm 140 in the horizontal direction (that is, the direction along the shaft portion 141, in other words, the longitudinal direction of the arm 140) and rotates around the shaft portion 141, based on the control signal received from the control unit 100. The arm drive mechanism 150 includes, for example, a motor and a linear guide, and moves the arm 140 in the horizontal direction and rotates the shaft portion 141. However, as the arm drive mechanism 150, a known mechanism for performing the operations above may be used.

As described above, the arm 140 is movable in the horizontal direction, and the hook 142 is rotatable as the shaft portion 141 rotates. That is, the hook 142 is rotatable with the shaft portion 141 as the rotation axis. As described above, the direction of the hook 142 can be changed.

The arm 140 is used to perform an operation for an arbitrary operation target present in the moving environment of the autonomous mobile robot 11. At that time, the autonomous mobile robot 11 may operate the operation target using the hook 142. In the present embodiment, the hook 142 at the tip of the arm 140 is hooked on the hook receiver 93 on the bottom surface of the object 90 mounted on the mounting portion 130 so as to suppress the object 90 from moving in the vertical direction. That is, the arm 140 for operating the operation target is diverted to restrict the vertical movement of the object 90 mounted on the mounting portion 130.

Figure 12:
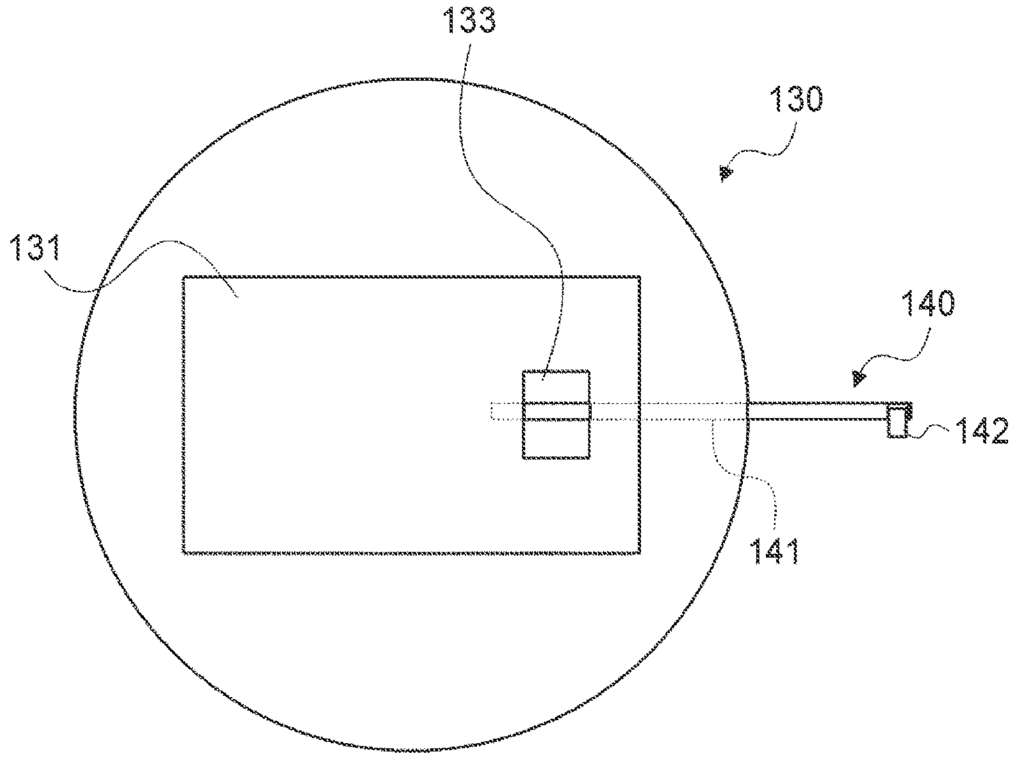
FIG. 12 is a plan view of the mounting portion in a state in which the tip of an arm protrudes outward of the mounting portion in the horizontal direction.
Figure 13:
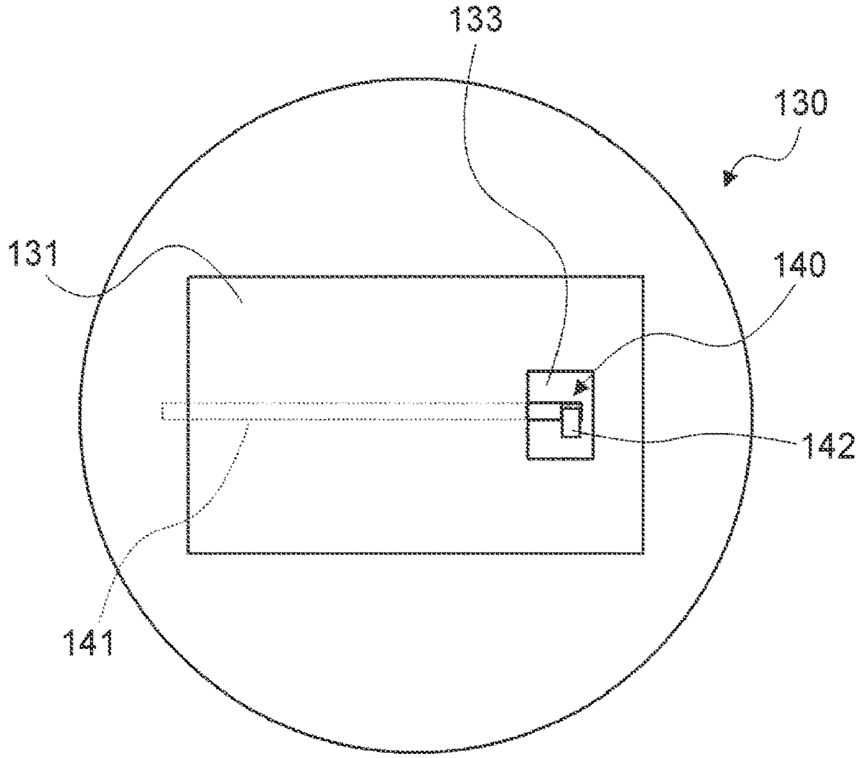
FIG. 13 is a plan view of the mounting portion in a state in which the tip of the arm is pulled toward the mounting portion.

Here, the horizontal movement of the arm 140 is shown in the drawings. FIG. 12 is a plan view of the mounting portion 130 in a state in which the tip of the arm 140 protrudes outward of the mounting portion 130 in the horizontal direction. Further, FIG. 13 is a plan view of the mounting portion 130 in a state in which the tip of the arm 140 is pulled toward the mounting portion 130. For example, the operation for the operation target using the arm 140 is performed in a state in which the tip of the arm 140 protrudes outward of the mounting portion 130 in the horizontal direction. Further, the hook 142 of the arm 140 and the hook receiver 93 on the bottom surface of the object 90 are engaged with each other in a state in which the tip of the arm 140 pulled toward the mounting portion 130. As shown in FIG. 13, the tip of the arm 140 is pulled toward the mounting portion 130, whereby the hook 142 comes to the position of the opening 133 provided on the bottom surface of the recessed portion 131. In a state in which the hook 142 is located directly below the opening 133, the shaft portion 141 rotates such that the hook 142 faces upward, whereby the hook 142 is hooked on the hook receiver 93 of the object 90. That is, switching the state of the hook 142 from the hook stored state to the hook used state engages the hook 142 with the hook receiver 93 of the object 90. As described above, the hook 142 changes its state from the hook stored state to the hook used state as the hook 142 rises by rotating. The hook 142 switches between the hook used state and the hook stored state in accordance with the control signal from the control unit 100.

That is, the control unit 100 according to the present embodiment controls the operations of the moving portion 110, the telescopic portion 120, and the arm 140. The control unit 100 can control the horizontal movement of the arm 140 and rotation of the hook 142, that is, the direction of the hook 142 by transmitting the control signal to the arm drive mechanism 150. With this configuration, the control unit 100 controls the operation of the operation target using the arm 140. Further, the control unit 100 causes the hook 142 to hook on the object 90 mounted on the mounting portion 130 from below. When the predetermined locking condition is satisfied, the control unit 100 changes the state of the hook 142 to the hook used state. That is, when the predetermined locking condition is satisfied, the control unit 100 pulls the arm 140 toward the mounting portion 130, and further rotates the shaft portion 141 to control the hook 142 to rotate. Further, when the predetermined unlocking condition is satisfied, the control unit 100 changes the state of the hook 142 to the hook stored state. That is, when the predetermined unlocking condition is satisfied, the control unit 100 rotates the shaft portion 141 so as to disengage the hook 142 from the hook receiver 93 of the object 90. As described above, the control unit 100 causes the hook 142 to hook on or disengage from the object by rotating the hook 142 with the shaft portion 141 as the rotation axis.

The second embodiment has been described as above. In the present embodiment, the arm 140 for operating the operation target is used to restrict the vertical movement of the object. Therefore, it is possible to suppress the object mounted on the mounting portion 130 from moving in the vertical direction without providing a dedicated hook. That is, the hook 142 of the arm 140 can be used for various purposes. In the present embodiment, the hook 132 shown in the first embodiment is omitted. However, the autonomous mobile robot 11 may include the hook 132. That is, the autonomous mobile robot 11 may more reliably suppress the object from moving in the vertical direction using the hook 132 and the hook 142 of the arm 140.

The present disclosure is not limited to the above embodiments, and can be appropriately modified without departing from the spirit.

What is claimed is:

1. An autonomous mobile robot used in a transport system for transporting an object, comprising:

a mounting portion on which the object is mounted; and a hook that hooks on the object mounted on the mounting portion from below, wherein an upper surface of the mounting portion includes a recessed portion having a shape corresponding to a shape of an entire surface of a bottom surface of the object mounted on the mounting portion, a horizontal surface of the recessed portion is configured to contact the bottom surface of the object when the object is mounted on the mounting portion, an opening is provided on the horizontal surface of the recessed portion, the hook is located in the opening, stored below the horizontal surface of the recessed portion when the hook is unhooked on the object, and protrudes above the horizontal surface of the recessed portion when the hook hooks on the object, the hook includes a middle portion, a first arm and a second arm, the first arm extending in a vertical direction connecting the middle portion and a base surface of the opening, the second arm being rotatably connected to the first arm via the middle portion, the second arm being folded toward the first arm when the hook is unhooked on the object and being rotated relative to the first arm to be aligned with the first arm in the vertical direction when the hook hooks on the object, the opening is configured to be positioned opposing a hook receiver of the object that is recessed from the bottom surface of the object when the object is mounted on the mounting portion, the hook is configured to protrude inside the hook receiver when the object is mounted on the mounting portion, and the middle portion and the first arm are at respective fixed distances away from the base surface before, during, and after the folding of the second arm.

2. The autonomous mobile robot according to claim 1, further comprising a motor, wherein the hook is movable below and above the horizontal surface of the recessed portion by actuating the motor.

3. The autonomous mobile robot according to claim 1, further comprising:

an arm including a shaft with the hook provided on the shaft, a motor, and a processor that controls the motor to rotate the shaft to rotate the hook into position to hook on the object mounted on the mounting portion from below.

4. The autonomous mobile robot according to claim 3, further comprising a linear guide, wherein the processor controls the motor to move the arm horizontally along the linear guide and position the hook directly below the opening; and rotate the hook to hook on the object.

* * * * *